Dec. 27, 1938.   A. C. DE HOFFMANN   2,141,866
LICENSE PLATE HOLDER DEVICE
Filed Aug. 11, 1937   3 Sheets-Sheet 1
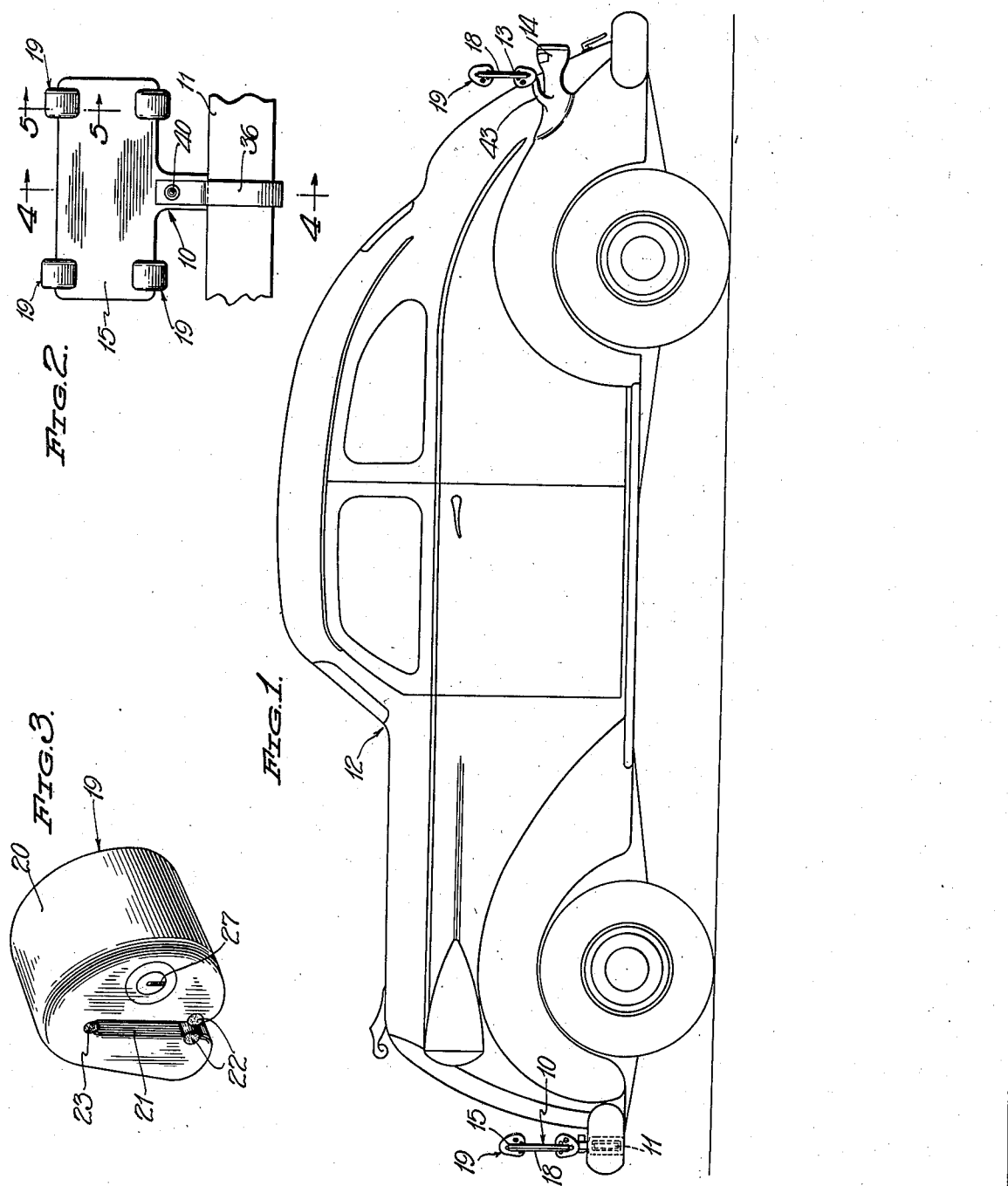
Alexander C. de Hoffmann.
INVENTOR.
BY Ely & Pattison
ATTORNEYS Dec. 27, 1938. A. C. DE HOFFMANN 2,141,866
LICENSE PLATE HOLDER DEVICE
Filed Aug. 11, 1937 3 Sheets-Sheet 2
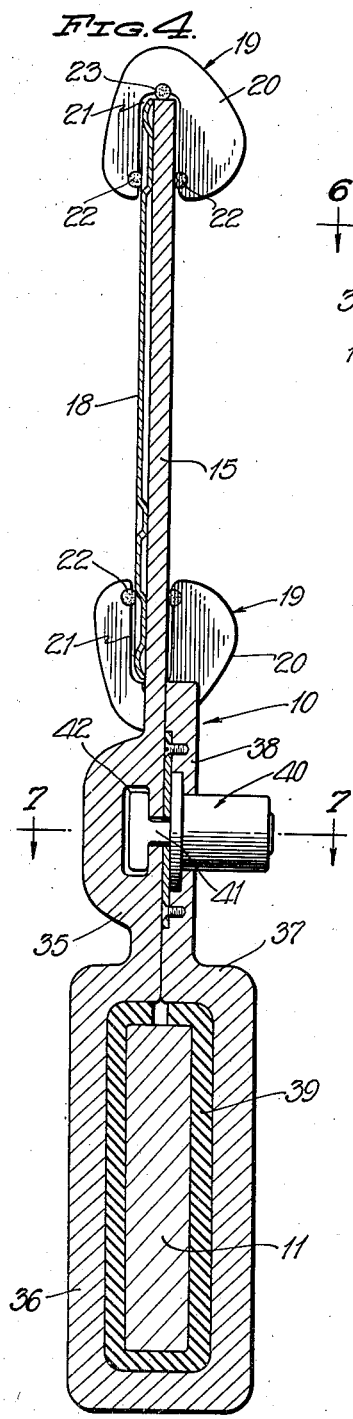
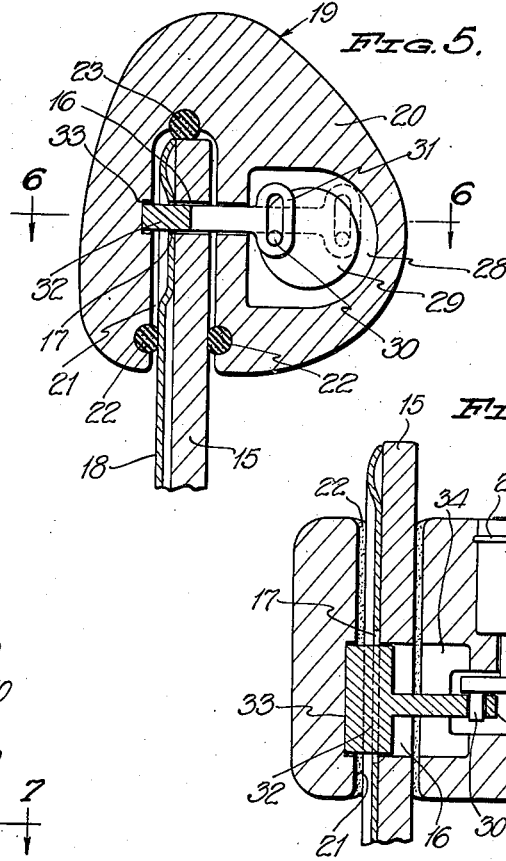
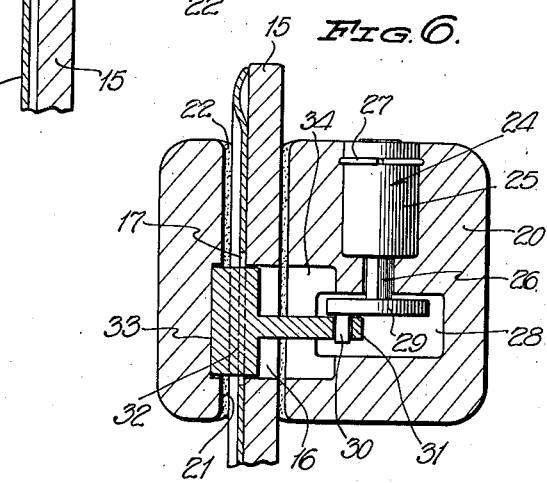
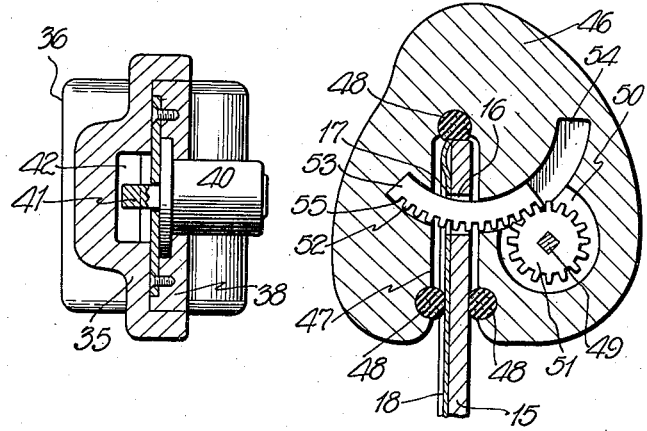
Alexander C. de Hoffmann.
INVENTOR.
BY Ely & Pattison,
ATTORNEYS.

Dec. 27, 1938.   A. C. DE HOFFMANN   2,141,866
LICENSE PLATE HOLDER DEVICE
Filed Aug. 11, 1937   3 Sheets-Sheet 3
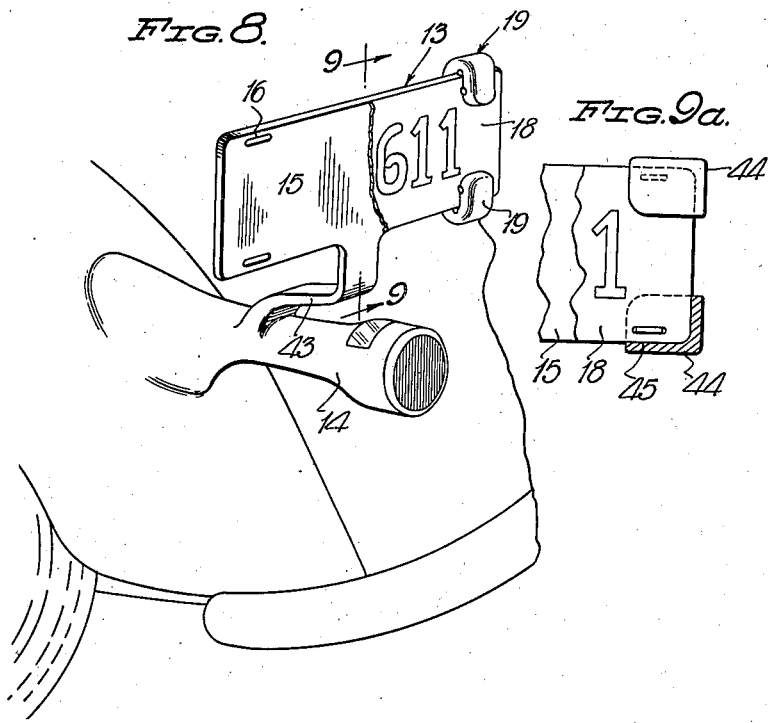
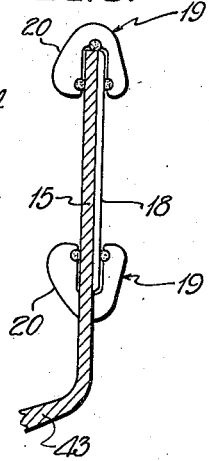
Alexander C. de Hoffmann.
INVENTOR.

Patented Dec. 27, 1938

2,141,866

UNITED STATES PATENT OFFICE 2,141,866

LICENSE PLATE HOLDER DEVICE

Alexander C. de Hoffmann, New York, N. Y.

Application August 11, 1937, Serial No. 158,467

6 Claims. (Cl. 40—125)

This invention relates to improvements in license plate holders for motor vehicles and more particularly to a device for supporting and visibly displaying a license plate and for protecting the same against theft.

Many crimes are committed in which automobiles are relied upon by the culprit to effect an escape from the police authorities, and it is not uncommon for an innocent owner of an automobile to suffer embarrassment and inconvenience by having his license plates stolen and used on an automobile involved in a crime, the substitution of license plates being resorted to by the culprit of the crime to escape by automobile without arousing police suspicion.

It is therefore one of the principal objects of this invention to provide a device in which an automobile license plate may be locked in a displayed position and protected against unauthorized removal by the unscrupulous.

Another feature of the invention resides in a license plate holder device which holds a license plate in a locked condition in a novel manner which prevents unauthorized removal of the license plate without mutilation of the same, which mutilated license plate could not be used upon an automobile without arousing suspicion of the police authorities.

A further object of the invention is the provision of a license plate holder within which a license plate is securely locked, and in which the holder is connected to an automobile in a manner to prevent unauthorized removal of the holder and license plate as a unit.

A further feature of the invention is the provision of a theft proof license plate holder in which key actuated locks are employed for locking the license plate to the holder, use being made of the usual elongated slots in the license plate to receive the bolts of the locks, whereby the license plate is locked adjacent the four corners thereof and can only be removed without mutilation by an authorized person having the proper key necessary for unlocking the locks.

A still further object of the invention is to provide a license plate holder having the above beneficial characteristics which is simple and inexpensive of construction and strong and durable for the life of an automobile.

With these and other objects in view, the invention resides in the certain novel construction, combination and arrangement of parts, the essential features of which are hereinafter fully described, are particularly pointed out in the appended claims, and are illustrated in the accompanying drawings, in which:

Figure 1 is a side elevational view of an automobile illustrating one form of license plate holder in use thereon.

Figure 2 is a rear elevation of the front detachable holder unit.

Figure 3 is a perspective view of one of the lock devices.

Figure 4 is an enlarged vertical transverse sectional view on the line 4—4 of Figure 2.

Figure 5 is an enlarged vertical sectional view on the line 5—5 of Figure 2.

Figure 6 is a horizontal sectional view on the line 6—6 of Figure 5.

Figure 7 is a horizontal sectional view on the line 7—7 of Figure 4.

Figure 8 is a fragmentary perspective view of the rear end of the automobile showing the rear license plate holder unit with parts broken away.

Figure 9 is a detail vertical sectional view on the line 9—9 of Figure 8.

Figure 9a is a modified form of lock device for protecting the corners of the license plate.

Figure 10 is a detail vertical sectional view of a further modified form of lock device.

Referring to the drawings by reference characters, and at present to the form of the invention shown in Figures 1 to 9 inclusive, the numeral 10 designates the front license plate holder device in its entirety mounted on the bumper bracket 11 at the front of an automobile 12, while the numeral 13 designates the rear license plate holder unit supported and formed integral with the tail light housing 14 at the rear of the automobile 12. The license plate units 10 and 13 are identical in construction and only the means by which the said units are attached to the automobile are different, and which means will be specifically described hereinafter, but it is thought that a description of one of the license plate holder units will suffice for the other.

Each license plate holder unit includes a flat rectangular shaped body or supporting member 15 of a size and shape approximating that of the license plate to be supported thereby. The body 15 is of strong rigid construction and is provided adjacent its four corners with elongated horizontally disposed slots 16, which slots register with similar slots 17 provided in the automobile license plate 18, which plate fits against the front side of the supporting member or body 15.

For locking the license plate 18 against the front side of the body 15 adjacent the four corners of the body and the license plate, I provide removable lock units 19. The lock units 19 are of identical construction and a description of one will suffice for the others.

Each lock unit 19 includes a kidney shaped strong rigid body 20 which is provided with a pocket or recess 21 which opens along three sides of the body to enable the body to be inserted over the edge of the holder body 15 and license plate 18. Although I have mentioned the body 20 as being of substantially kidney shape, the same may be said to be U-shaped, or may be of any other shape provided it is formed with the pocket 21 and sufficient thickness to support the lock mechanism to be described. The side walls of the pocket 21 are straight and parallel and set therein to project inwardly beyond the planes of the walls are yieldable rubber cushion strips 22, there also being a similar strip 23 mounted in the closed end wall of the pocket 21 for yieldably engaging the edge of the holder plate 15 as best illustrated in Figure 5 of the drawings. The cushion strips 22 and 23 yieldably engage the license plate 18 and the holder plate 15 to prevent rattle of the body 20, license plate 18, and holder body 15 relative to each other.

Mounted in the body 20 to one side of the pocket 21 is a key actuated lock 24 including a barrel 25 and the usual rotatable key actuated shaft 26. The axis of the lock 24 is parallel to the length of the pocket 21 with the key receiving slot 27 of the lock disposed at one end of the body 20. The lock 24 may be mounted in the body 20 in any suitable manner, but preferably by some hidden means to prevent its easy removal, such as for instance by the split locking ring 27 shown in Figure 6 of the drawings. The turntable shaft 26 extends into a recess 28 provided in the body 20 and has fixed thereto, a disk 29 provided with an outwardly extending eccentric pin 30. The pin 30 freely extends into an elongated slot or yoke 31 provided at the inner end of a sliding bolt 32, the said bolt when in locking position, passing through the registering slots 16 and 17 in the holder body 15 and license plate 18, respectively, and is received in a keeper recess 33 provided in that wall of the pocket 21 opposite from that in which the bolt extends. It will be seen that by inserting the proper key into the key hole slot 27 of the lock 24, the shaft 26 may be turned to move the bolt 32 to either an extended or retracted position by reason of the eccentric connection between the disk 29 and the tail end of the bolt 32. By reference to Figure 6, it will be noted that the bolt 32 is substantially T-shaped, and the head enters a cavity 34 in the body 20 when in retracted position, such position being shown in dotted lines in Figure 5.

From the description thus far, it will be seen that when the license plate 18 is locked adjacent the four corners to the supporting plate 15, any attempt at the removal of the license plate by an unauthorized person will be frustrated, for it will be necessary for an unauthorized person to break the locks of the four lock units 19. However, the owner of the automobile or an authorized person having the proper key may readily unlock the lock units 19 and remove the license plate 18 for replacement or for any other purposes.

As previously mentioned the holder units 10 and 13 although of identical construction, are attached to the automobile by different attaching means. The holder unit 10 is detachably connected to the bracket 11 of the front bumper, but is so fastened to prevent unauthorized removal of the holder unit. The body 15 of the holder unit 10 is provided with a depending arm 35, the lower end of which terminates in a resilient clamp 36, which clamp includes a resilient separable part 37 having an upstanding terminal tail piece 38. The inner walls of the clamp 36 are lined with a rubber cushion 39 which surrounds the bumper bracket 11 as illustrated in Figure 4 of the drawings. The bottom of the clamp 36 being resilient, it will be seen that by pulling outwardly upon the tail piece 38, the jaws of the clamp may be separated for the attachment and removal of the holder unit to the bumper bracket 11, but for preventing unauthorized opening of the clamp, I provide a key actuated lock 40 supported by the tail piece 38. The rotating barrel of the lock 40 has a T-shaped lock bolt 41 connected thereto, the said bolt being normally in a horizontal position when unlocked to enter a T-shaped keeper recess 42 and after entering the recess 42, the bolt 41 is turned from a horizontal position to a vertical position to lock behind the walls of the recess 42. The key that controls the opening of the lock 24 of the lock units 19 may be the same as that necessary to actuate the bolt 41 of the lock 40.

The holder unit 13 as before mentioned is supported by the tail light housing 14 of the automobile and is mounted thereon by forming an angular arm 43 integral with the supporting body 15 and the lamp housing 14. Thus, any attempt to remove the rear holder unit 13 is prevented for it becomes necessary to break the bracket arm 43 to remove the unit from the vehicle.

In Figure 9a of the drawings, a slightly modified form of lock unit is shown, and these units are designated by the numeral 44. Each unit 44 includes the usual recess 45 for receiving the license plate and the holder body, the walls of the recesss being at right angles to overlie the corners of the license plate and the holder body to prevent the insertion of an instrument therebetween. It is not believed necessary to go into the specific construction of the lock mechanism embodied in the lock units 44 for they are otherwise identical to the lock units 19 hereinbefore described.

In Figure 10 of the drawings, a furhter modified form of lock unit is illustrated and includes a substantially kidney shaped body 46 having a plate receiving pocket or recess 47 opening onto three sides thereof. Set in the walls of the pocket 47 are resilient cushion strips 48 for resilient engagement with the supporting body 15 and the license plate 18. The rotating barrel of the key actuated lock is provided with a square extension shaft 49 which extends into a recess 50 and has fixed thereto, a gear wheel 51. The gear wheel 51 meshes with the teeth 52 on the convex side of an arcuate shaped lock bolt 53, the said bolt being retractible into a recess 54 in the body 46 and when extended, the said bolt passes through the registering openings 16 and 17 in the holder body 15 and license plate 18 respectively. When in extended position, the outer end of the lock bolt 53 enters a keeper recess 55 in the body 46.

Whereas I have illustrated several forms of my invention, it will be noted that in all instances, the license plate is securely locked in the holder by bolts which pass through the openings in the license plate which necessitates retraction of the bolts before the license plate can be removed. Should an unauthorized person be successful in breaking the locks, the license plate undoubtedly would become mutilated and arouse suspicion of the police authorities should the mutilated plates be used upon an automobile involved in a crime, and in which the occupants thereof may be seeking an escape.

Although I have shown several forms of my invention, I wish it to be understood that further modification may be resorted to if desired without in any way departing from the spirit of the invention, or the scope of the appended claims.

Having thus described the invention, what I claim as new and desire to secure by Letters Patent of the United States, is:

1. In combination, an automobile license plate of rectangular configuration having openings therein adjacent each corner thereof, a flat supporting member of a shape and size approximating that of said license plate, and adapted to be securely attached to an automobile and against which the rear side of said license plate fits, said supporting member having openings therein registering with the openings in said license plate, and individual lock units located adjacent the corners of said license plate and supporting member including bolts passing through the registering openings in said license plate and supporting member to lock the same together.

2. In combination, an automobile license plate of rectangular configuration having openings therein adjacent each corner thereof, a flat holder member of a size and shape approximating that of said license plate and against which the rear side of said license plate fits, said holder member having openings therein registering with the openings in said license plate, and individual lock units located adjacent the corners of said license plate and supporting member and fitting over the edges thereof, each of said lock units including a body having a pocket therein receiving the edge of said license plate and said holder member, a key actuated lock mechanism mounted in said body including a bolt passing through the registering openings from one wall of said pocket to the other wall thereof.

3. In combination, an automobile license plate of rectangular configuration having openings therein adjacent the corners thereof, a flat holder member of a size and shape approximating that of said license plate and against which the rear side of said license plate fits, said holder member having openings therein registering with the openings in said license plate, and individual lock units located adjacent the corners of said license plate and holder member and fitting over the edges thereof, each of said lock units including a body having a pocket therein receiving the edges of said license plate and said holder member, cushioning means between the walls of said pocket and said license plate and holder member, and a key actuated lock mechanism including a bolt passing through the registering openings from one wall of said pocket to the other wall thereof.

4. In combination, an automobile license plate of rectangular configuration having openings therein adjacent each corner thereof, a flat holder member of a size and shape approximating that of said license plate and against which the rear side of said license plate fits, said holder member having openings therein registering with the openings in said license plate, individual rigid clip-like members including an angular recessed body fitting about the corner edges of said license plate and holder member, and key actuated lock mechanism carried by said clip-like members, each lock mechanism including a lock bolt movable through the registering openings when in extended position and clear of the same when in retracted position.

5. In combination, an automobile license plate, a fixed flat supporting member having registering openings adjacent an edge thereof, a lock device including a body having a bifurcation therein receiving the edges of said license plate and holder member, yieldable cushion elements carried by the walls of said bifurcation and in bearing engagement with said license plate and holder member, a bolt slidably mounted in said body and extendable through one of the side walls of said bifurcation and through said registering openings to bridge the said bifurcation, and key actuated means in said body for sliding said bolt to extended or retracted position.

6. In combination, an automobile license plate, a fixed flat holder member, a lock device including a bifurcated body fitting over the edges of said license plate and holder member, yieldable cushion means carried by and extending beyond the inner walls of said bifurcated body in bearing engagement with the edges and outer sides of said license plate and holder member, and lock means carried by said body for locking said license plate and holder member together.

ALEXANDER C. DE HOFFMANN.